(12) United States Patent
Thurner

(10) Patent No.: US 7,831,316 B2
(45) Date of Patent: Nov. 9, 2010

(54) DEVICE AND METHOD FOR PROGRAMMING AND/OR EXECUTING PROGRAMS FOR INDUSTRIAL AUTOMATION SYSTEMS

(75) Inventor: Elmar Thurner, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/560,839

(22) PCT Filed: May 4, 2004

(86) PCT No.: PCT/EP2004/004740

§ 371 (c)(1),
(2), (4) Date: Jun. 8, 2006

(87) PCT Pub. No.: WO2004/111738

PCT Pub. Date: Dec. 23, 2004

(65) Prior Publication Data

US 2006/0259157 A1    Nov. 16, 2006

(30) Foreign Application Priority Data

Jun. 18, 2003   (DE) .............................. 103 27 614

(51) Int. Cl.
*G05B 11/01* (2006.01)
(52) U.S. Cl. .............................. 700/18; 700/17; 700/86; 700/87; 700/181
(58) Field of Classification Search .................. 700/17, 700/18, 86, 87, 181
See application file for complete search history.

(56) References Cited

U.S. PATENT DOCUMENTS

| | | | | |
|---|---|---|---|---|
| 6,263,487 | B1 * | 7/2001 | Stripf et al. ................. | 717/171 |
| 6,853,867 | B1 * | 2/2005 | Klindt et al. .................. | 700/83 |
| 7,151,966 | B1 * | 12/2006 | Baier et al. ................... | 700/19 |
| 2002/0010696 | A1 * | 1/2002 | Izumi ........................... | 707/7 |
| 2002/0129129 | A1 * | 9/2002 | Bloch et al. ................. | 709/220 |
| 2003/0009572 | A1 * | 1/2003 | Thurner ..................... | 709/230 |
| 2003/0014440 | A1 | 1/2003 | Bussert et al. | |
| 2003/0061349 | A1 * | 3/2003 | Lo et al. ..................... | 709/225 |
| 2005/0108265 | A1 * | 5/2005 | Langkafel et al. .......... | 707/101 |

FOREIGN PATENT DOCUMENTS

DE          101 38 533 A1      7/2002

(Continued)

OTHER PUBLICATIONS

Supporting Document: (Wikipedia definition of XML) pp. 1-16.*

(Continued)

*Primary Examiner*—Albert DeCady
*Assistant Examiner*—Tejal J Gami

(57) ABSTRACT

The invention relates to a method for programming and/or executing programs for industrial automation systems. Modules and functions that respectively represent partial tasks of an automation solution are modeled and/or generated by using input aids and optionally a display device. The modules and functions are structured and networked by input aids and optionally the display device in such a way that they form at least one hierarchical tree, as at least one machine-independent program. According to the invention, each machine-independent program in the form of at least one hierarchical tree is loaded into the corresponding components of the automation system. The corresponding components of the automation system execute each machine-independent program.

18 Claims, 3 Drawing Sheets

FOREIGN PATENT DOCUMENTS

| | | |
|---|---|---|
| DE | 101 32 036 A1 | 1/2003 |
| EP | 1 296 232 A2 | 3/2003 |
| WO | WO 97/26587 | 7/1997 |

OTHER PUBLICATIONS

Supporting Document: Wikipedia online encyclopedia definition of Java programming language (pp. 1-14).*

Supporting Document: Wikipedia definition of Container (data structure).*

Siemens AG, Pressseabteilung: "Siemens verleiht erfinderpreis 2002", Dec. 17, 2002, Siemens AG, Müchen, Germany, Retrieved from the Internet: URL:http://w4.siemens.de/ct/de/news/2202_2003/ct200212004d.pdf>, pp. 1-11; XP002294786.

* cited by examiner

US 7,831,316 B2

DEVICE AND METHOD FOR PROGRAMMING AND/OR EXECUTING PROGRAMS FOR INDUSTRIAL AUTOMATION SYSTEMS

CROSS REFERENCE TO RELATED APPLICATION

This application is the US National Stage of International Application No. PCT/EP2004/004740, filed May 4, 2004 and claims the benefit thereof. The International Application claims the benefits of German Patent application No. 10327614.9 DE filed Jun. 18, 2003, both of the applications are incorporated by reference herein in their entirety.

FIELD OF THE INVENTION

The invention relates to a device and a method for programming and/or executing programs for industrial automation systems.

BACKGROUND OF THE INVENTION

A generic method for programming industrial automation systems in the sense of the preamble of claim 1 is based on at least one computer unit with input aids, output aids and preferably at least one display device. Modules and functions, respectively representing sub-tasks of an automation solution, are modeled and/or created using the input aids and optionally the display device. The modules and functions may be assigned model information and/or meta-information using the input aids and the display device. The modules and functions are structured and networked using the input aids and optionally the display device, to form at least one hierarchical tree as at least one machine-independent program.

In conventional programming languages, such as Pascal or Fortran, data, modules and functions are separated. Data and functions were only combined as objects further to the paradigm of object orientation. Metadata is also assigned singly to the objects. Metadata is information about other information, for example information about available objects. Such metadata is present in an overall system or in an overall context but in automation systems it is neither stored physically in an object, nor does it contain knowledge about the application to be implemented for an industrial unit or about the process to be implemented.

Programmable automation systems or MES systems, in other words systems for controlling and/or regulating automated processes or units, generally include a so-called runtime system for temporal sequence control of an automation component of a machine or system. Such systems also have an engineering device to create and edit control programs and unit functions. The control programs and unit functions created using the engineering device are executed in the runtime system.

The as yet unpublished prior art includes the technique of programming automation systems by modeling objects, which respectively represent sub-tasks of an automation solution, in an engineering device using input aids and a display device. Model information and meta-information is also assigned to such objects via the input aids and the display device. The objects are then structured and networked as hierarchical trees to provide at least one machine-independent program.

According to the prior art the or each machine-independent program generated using the engineering device is converted in one or more stages to a machine-dependent automation program for the components of the automation system. This takes place according to the prior art based on the visual representation during programming, with the visual representation being converted to an imperative, sequential machine language or machine code. This sequential machine code is loaded onto an automation component, for example a programmable logic controller (PLC), for execution according to the prior art.

The imperative, sequential machine code therefore represents the standard machine-dependent automation program according to the prior art, which is loaded in this form onto the components or automation units of the automation system. Automation programs generated according to the prior art as described above are however inflexible, as they cannot easily be adjusted to the runtime. Also such automation programs can only be used on the specific components of an automation system, for which the corresponding machine code has been generated. The programs cannot therefore be used in a flexible manner.

In view of this, the problem facing the present invention is to create a novel method and device for programming and/or executing programs for industrial automation systems.

SUMMARY OF THE INVENTION

This problem is resolved by developing the method referred to above by means of the features of the claims.

According to the invention the or each machine-independent program is loaded into the corresponding components of the automation system in the form of at least one hierarchical tree, with the corresponding components of the automation system executing the or each machine-independent program directly, preferably with the aid of at least one object machine assigned to the same. The or each machine-independent program is preferably present in the form of at least one executable, hierarchical object or operator tree.

The claimed device for programming industrial automation systems is defined in the independent claims. A computer program for implementing the method or the device is claimed in the independent claims. The invention also relates according to the independent claims to a data processing device, on which such a computer program is installed.

Preferred developments of the invention will emerge from the subclaims and the description which follows.

BRIEF DESCRIPTION OF THE DRAWINGS

Preferred exemplary embodiments of the invention—to which the invention is not however restricted—are described in more detail below with reference to the drawing, in which.

DETAILED DESCRIPTION OF THE INVENTION

Figure 1:
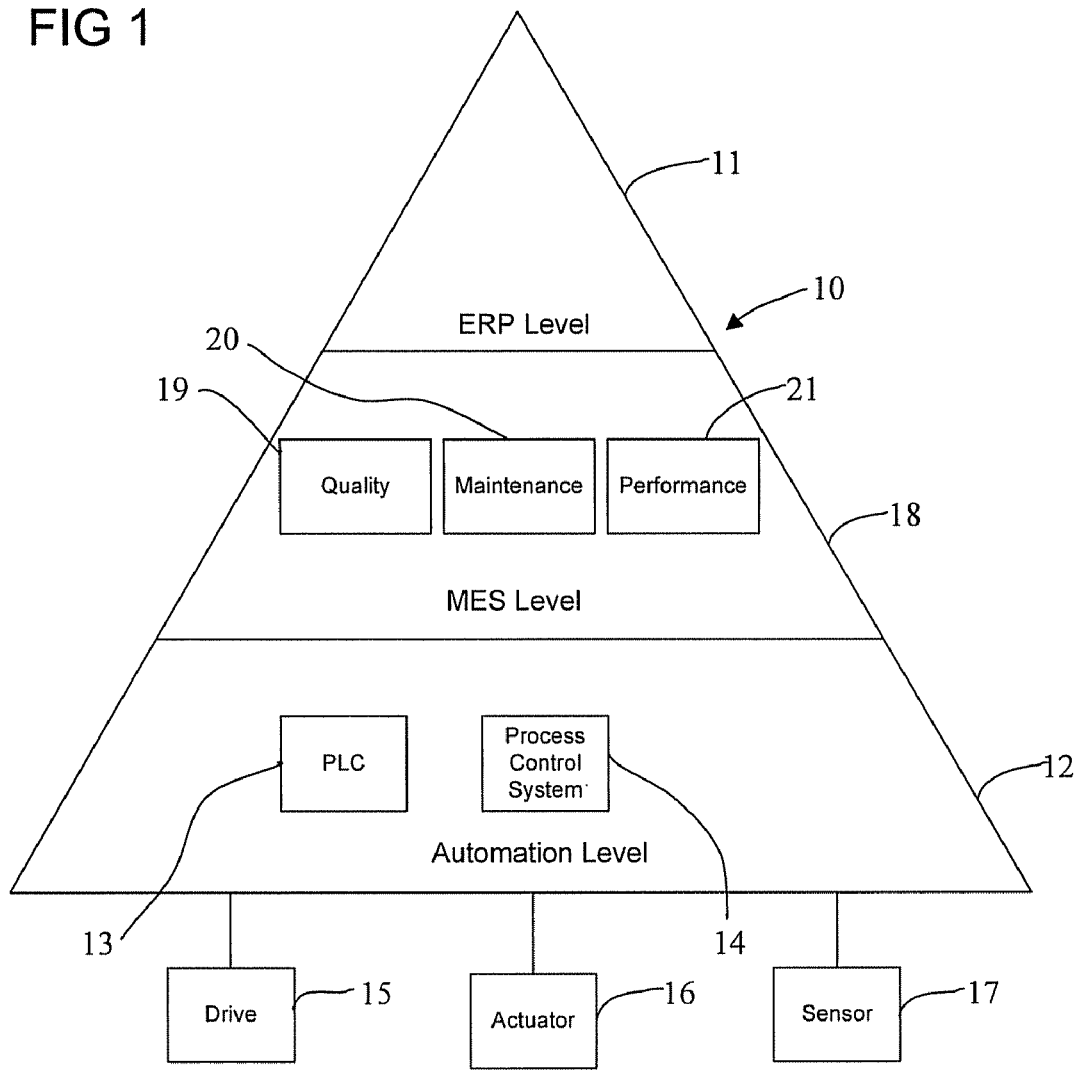
FIG. 1 shows a diagram of an automation pyramid with three control levels.

FIG. 1 shows an outline overview of three control levels, as generally found in a production company. A pyramid 10 shows that information is compressed upward.

The top level is the ERP (Enterprise Resource Planning) level 11. It is at this ERP level 11 or corporate level that economic and marketing tasks are generally planned and implemented in a company, for example finance, sales, HR and reporting. However logistics tasks that also relate to production units, such as materials administration, are also carried out at this ERP level 11. The SAPR/3 system is for example an ERP system, which is very frequently used at corporate level.

The lowest level of the pyramid according to FIG. 1 is the so-called automation level 12. Programmable logic controllers (PLC) 13 in conjunction with visualization systems and process control systems 14 are generally deployed at this level. The drives 15, actuators 16 and sensors 17 of production and/or manufacturing units are connected directly to the automation level 12.

The connecting element between the ERP level 11 and the automation level 12 is the MES level 18. The applications of the MES level 18 thus ensure vertical integration between the ERP level 11 and the automation level 12. The MES applications on the one hand have to supplement the outline planning of the ERP level 11 with detailed planning specific to the production units and forward it to the systems of the automation level 12 while on the other hand it is also the task of the MES applications to receive data of relevance to production from the automation level 12, process it and forward it to the ERP level 11. Typical MES applications include quality management 19, maintenance management 20, performance analysis 21, process management and even asset management.

The three dots in FIG. 1 show that there may be further applications or elements on a level.

The automation level 12, the MES level 18 or MES unit or the ERP level 11 or ERP unit generally contain a so-called runtime system for temporal sequence control of the components involved (sub-components, modules, tasks, operating system processes, etc.). These levels or units also contain a so-called engineering device to create and edit programs provided for execution in the runtime system.

Figure 2:
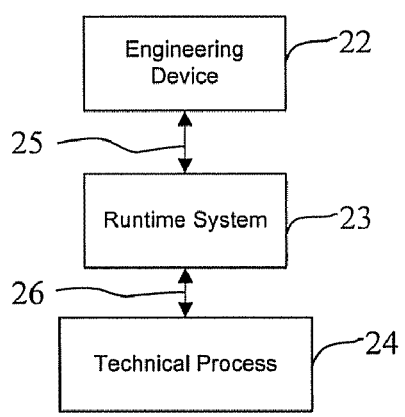
FIG. 2 shows a schematic diagram of an engineering device, a runtime system and a technical process to be controlled.

FIG. 2 shows a highly schematic diagram of an engineering device 22, a runtime system 23 and a technical process to be controlled 24. The runtime system 23 of the controller or automation system and the technical process 24 are connected bi-directionally via input and/or output connections 26. Programming takes place in the engineering device 22. The engineering device 22 contains tools for the configuration, programming and planning of technical processes, such as industrial units. The programs created in the engineering device 22 are transmitted via an information path 25 to the runtime system 23 of the MES device or ERP device or another destination system.

The engineering device 22 generally comprises a computer system with graphics screen, input aids, such as a keyboard and mouse, processor, main memory and secondary memory, a unit to receive computer-readable media, such as diskettes and CDs, and connecting units for an exchange of data with other systems. The engineering devices 22 have editors and graphics tools for modeling and programming units and controllers. In the case of engineering devices that are not object-oriented, machine-independent programs are created with the aid of graphic contact diagrams, function diagrams, sequence function charts or continuous function charts. In the case of object-oriented engineering devices, programs are created with aid [lacuna] in an object-oriented manner. In particular object-oriented engineering devices 22 support object-orientation, such as the creation of objects, the creation of classes, the creation of higher classes and the representation of inheritance relationships.

Editors, mask input or drag & drop mechanisms are used to link data modules, function modules or objects preferably to meta-information, structure them as hierarchical trees and network them. Programs, controllers or unit specifications created with the aid of such an engineering device 22 are machine-independent.

Programs created with the aid of the engineering device 22 ultimately have to be executed on a destination system, for example the components of the automation system, to control the technical process 24. Before looking in more detail at this, we must examine the relationships during the creation of machine-independent programs in more detail below.

Figure 3:
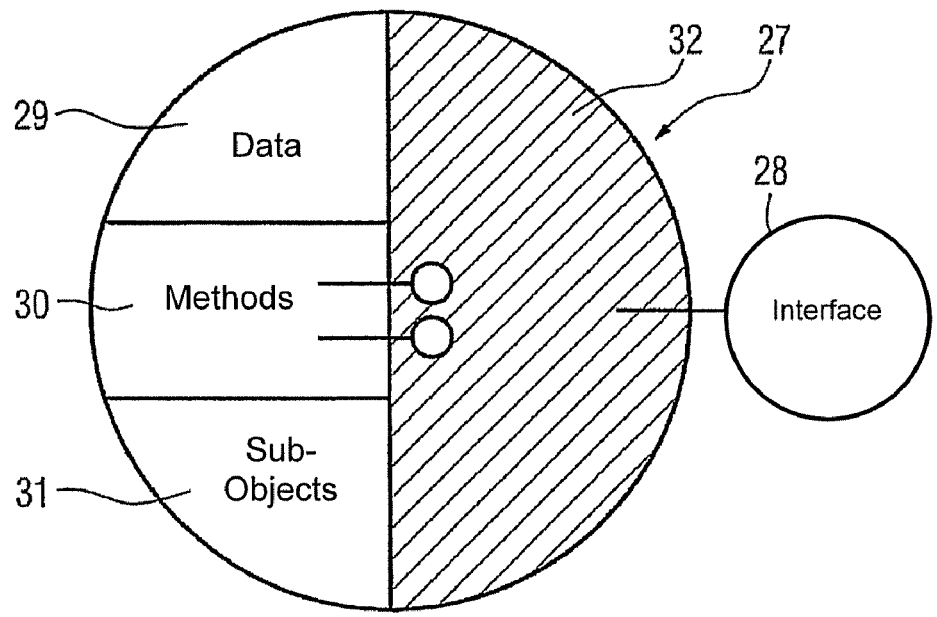
FIG. 3 shows a schematic diagram of an object.

FIG. 3 shows a highly schematic diagram of an object 27 with an object interface 28. Such objects 27 can be used in all types of engineering, such as chemical engineering, product engineering, software engineering, etc. An object 27 is generally an item or an element or domain or a discourse world. In object-oriented software development an object 27 is an individual example of things or matters, people or concepts in the real or imaginary world. An object 27 has a specific defined status and reacts with a defined response to its environment. Such an object 27 also has an object identity that differentiates it from all other objects and allows it to access another specific object. An object can know one or a number of other objects. Connections or branches or networks exist between objects that know each other. The status of an object 27 is defined by its data or attribute values and its respective connections with other objects. The response of an object is defined by its set of methods or operations. In object orientation an object type is described by a class. Specific entities, which then represent a specific programming language object, can be generated from this type description. Object diagrams are used to represent objects and their connections graphically. Such object diagram editors are part of object-oriented engineering devices. These diagrams can be edited and processed by a user in such an object-oriented engineering device.

The left part of the diagram in FIG. 3 shows information or elements generally contained in an object 27. Data 29 can be an actual measured value or a manipulated variable for example. Methods 30 represent executable activities in the sense of an algorithm, for example an AND operation or a control algorithm. The set of methods defines the response of an object class or an object instantiated by said class. The methods 30 of an object can be used and launched by other objects. The objects 27 can also include so-called sub-objects 31, which the objects require to implement the methods 30. The sub-objects 31 form an object tree.

A so-called container 32 is shown hatched on the right side of the object 27 shown in FIG. 3. Such containers 32 are used to implement mechanisms for storing meta-information and mechanisms for accessing meta-information. The containers 29 represent an encapsulating layer around the object 27 and all access to object has to take place via the interface 28. The methods 30 and data 29 as well as the meta-information of the object 27 are accessed via the interface 28. When the data or methods are accessed, a service using the object can use the metadata to abstract from the specific structure and meaning of the data functions. All access takes place, as stated, via the generic interface 28. This allows objects 27 to be reused and exchanged. It is always possible to access objects 27 in the same manner even in complex systems. The so-called containers 32 in particular provide infrastructure functions, such as data networking, data storage and data visualization in a standard manner for all types of object. The infrastructure functions provided by a container 32 include trace functions, i.e. information about who is using an object and for how long. As already stated, the container 32 also contains meta-information and self-description information for the object 27.

Figure 4:
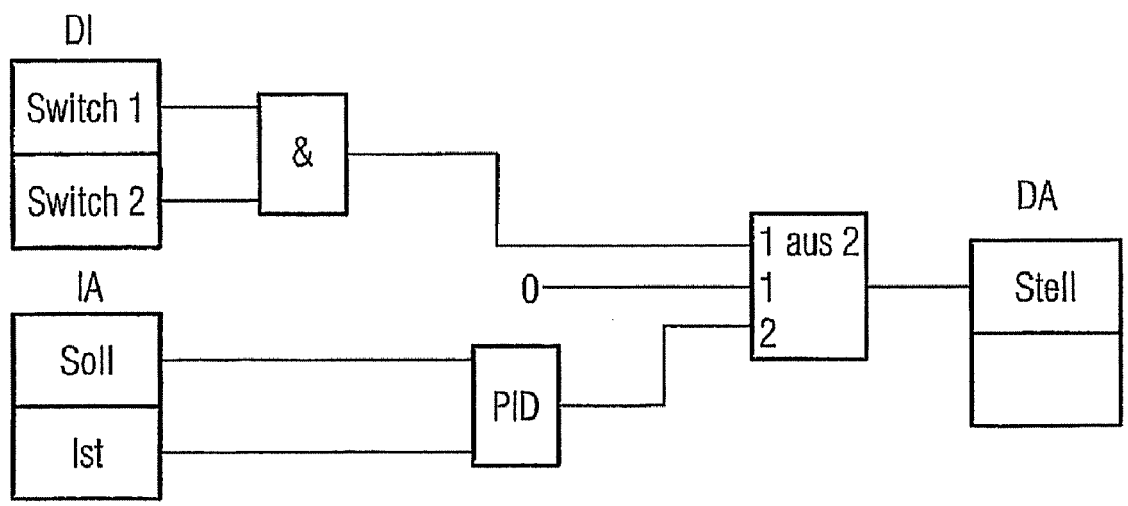
FIG. 4 shows a schematic diagram of a program and FIG. 5 shows a schematic diagram of the program according to FIG. 4 in a tree structure.
Figure 5:
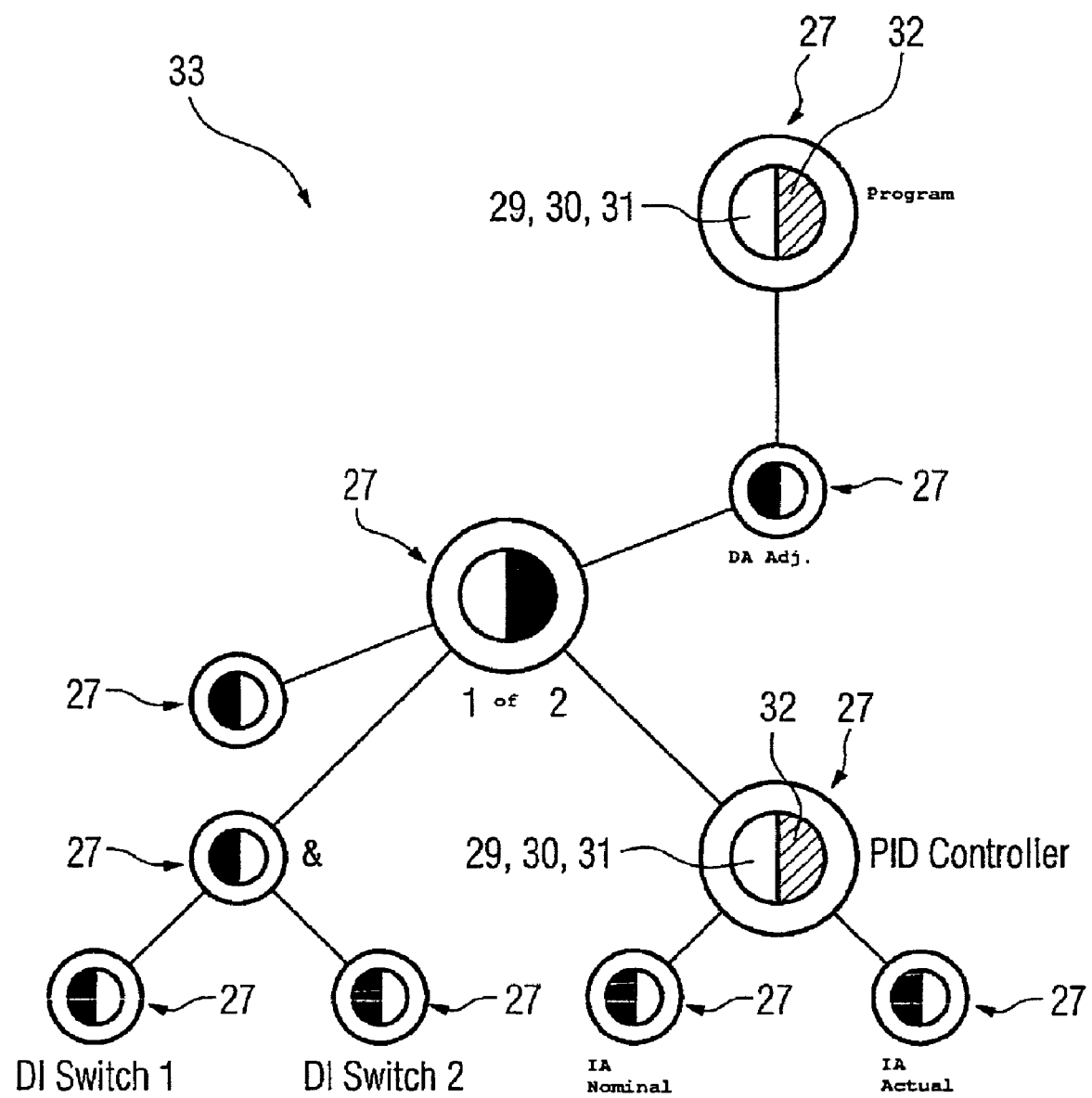

FIG. 4 shows a program represented in the engineering device 22. FIG. 5 shows the program in the form of an object or operator tree. The modules and functions of the program according to FIG. 4 are thus converted in FIG. 5 to objects 27, in the form of a hierarchical tree 33. The objects 27 are represented as double circles. The inner circle schematically represents the structure of an object in the sense of FIG. 3. The left part of an object 27 again relates to the data 29, methods 30 and sub-objects 31. The right part represents the so-called container 32, which provides the meta-information and infrastructure information for an object. The container 32 represents an encapsulating layer for the object 27. The object can only be accessed via the generic object interface 28. The outer circles round the objects show that the objects are embedded in the optional infrastructure of a system. The optional infrastructure provides generic services such as storage and loading. One aspect of the infrastructure is networking. Infrastructure services or corresponding functions are accessed via the container 32 and such access is the same for all objects 27 in the hierarchical tree 33. The outer circle of an object 27 therefore represents a collection of infrastructure services or infrastructure functions, which access the objects 27 via their containers 29. An infrastructure service that has been implemented can be used by all objects 27 in the same manner.

As already stated, FIG. 5 shows an example of a structure of a machine-independent program of a control task to be implemented as a hierarchical object tree 33, as it is loaded into the components of the automation system and processed there. The individual objects 27 of the tree 33 correspond to modules and functions of the program according to FIG. 4, as edited in an engineering device. This can be seen directly from the textual description of the program elements in FIGS. 4 and 5. The representation according to FIG. 4 shows a contact diagram or function diagram. This structural equivalence ensures that the program can be modified locally. The metadata assigned to the containers 32 of the objects 27 allows the current program to be mapped back onto the engineering representation In the context of the invention, a machine-independent program 33 modeled or created on the engineering device 22 preferably via objects 27 is not first converted to a machine-dependent automation program in the form of a sequential machine code and then loaded onto a component of the automation system or another destination device, as is normally the case with the prior art, rather the machine-independent programs are loaded into the corresponding components of the automation system in the form of hierarchical trees. The programs are then loaded onto a PLC or another automation device in the form of an object or operator tree. Such an object or operator tree is a 1:1 mapping of a representation of the program. Such an operator tree is a loadable program, which contains or can contain all the engineering data for the program.

The corresponding components of the automation system execute the machine-independent program. The or each machine-independent object or operator tree is loaded onto the corresponding components of the automation system using a machine-independent, symbolic representation of the tree, for example in the form of a byte code or mark-up language. XML (Extended Mark-up Language) can be used as the mark-up language.

The operators are instantiated during or after the loading of the machine-independent program into a component of the automation system. An object machine or even a real-time machine is used for this purpose. The object machine cancels the symbolic representation of the or each hierarchical tree 33 of the or each machine-independent engineering program, converts symbolic addresses to physical addresses, thereby creating or generating a loadable program in the form of an executable object or operator tree. This is executed on the or each component of the automation system.

The real-time object machine is assigned, as already stated, to the component of the automation system so that the component of the automation system can instantiate and execute the program. The real-time object machine provides objects, for example operators. The operators are logical operators, such as AND operations, OR operations, NOR operations or XOR operations for example. The operators can also be mathematical operators, such as operators for the basic arithmetic operations, interpolation operators or filter operators. The objects are preferably data objects or basic objects and control objects. The basic objects include data and characteristics. The characteristics are for example the maximum execution time, maximum memory usage or transaction capability of the object.

The executable operator tree comprises operators, namely logical and/or mathematic operators, and control objects. Control objects can for example be an instruction list, transaction containers, process containers, etc. Input data objects of a control object are at the same time output data objects of other operators or control objects. The objects are triggered to execute the operator tree. Object triggering is activated along the hierarchy and/or network of the objects, when all the necessary input data objects have been triggered. Data objects trigger when their value changes or their trigger is activated.

Connecting input data objects to sensor or actuator inputs and connecting output data objects to sensor or actuator outputs integrates the operator tree in the real automation environment, thus providing the loadable automation program. The use of transaction-capable, realtime-capable and/or error-tolerant objects creates executable operator trees, which themselves are transaction-capable, realtime-capable and/or error-tolerant in turn.

The claimed method and device for programming and/or executing programs for industrial automation systems allow a number of advantages to be achieved. A program generated with the aid of the invention can be executed on all components of an automation system, on which the object machine or real-time machine is implemented. The program can be adjusted to the runtime. Local sub-trees of the program provided as an executable operator tree can then be added, modified or deleted. Such a program is also self-describing, if self-describing objects are used. The machine-independent program can be visualized from the executable operator tree. There is therefore no need for a program store. The invention also shortens the engineering time. Programming takes place purely via lexical and semantic functions. It is no longer necessary to generate and optimize machine codes. When the programming is modified, it is only necessary to analyze and load modified program sub-trees. The remainder of the program can remain unchanged. Programs can be loaded onto a component of an automation system incrementally, in other words only the modified program element has to be loaded, not the entire program.

The invention claimed is:

1. A method for executing a program for an industrial automation system, comprising:
providing a computer unit with:
input aids,
output aids,
a display device, modules and functions respectively representing subtasks of an automation solution, and a program which is structured from the modules and functions;

converting the modules and functions of the structured program into objects to create a machine-independent program in the form of a hierarchical tree; and loading the machine-independent program in the form of the at least one hierarchical tree into the corresponding components of the automation system, wherein the corresponding components of the automation system execute the machine-independent program present in the form of the at least one hierarchical tree with the aid of at least one object machine assigned to the corresponding components of the automation system, and wherein the at least one object machine provides operators and objects from which the machine-independent program is provided in the form of the at least one hierarchical tree;

during or after loading of the machine-independent program, instantiating the operators using the at least one object machine into corresponding components of the automation system; and converting the symbolic representation of the hierarchical tree to physical addresses to generate a loadable program in the form of an executable program or operator tree.

2. The method according to claim 1, wherein the objects of the machine-independent program are present in the form of at least one hierarchical object or operator tree in the corresponding components of the automation system and are processed interpretatively.

3. The method according to claim 2, wherein the machine-independent program is present in the form of at least one object or operator tree with a structure equivalent or similar to the representation of the program in the display device.

4. The method according to claim 1, wherein the machine-independent program is loaded into the corresponding components of the automation system using a machine-independent, symbolic representation of the hierarchical tree.

5. The method according to claim 4, wherein the machine-independent and symbolic representation of the hierarchical tree is in the form of a byte code language or a markup language.

6. The method according to claim 1, wherein the object machine is configured as a real-time object machine with deterministic response and cycle times.

7. The method according to claim 1, wherein the object machine is implemented as a function unit that is closed and that processes the at least one hierarchical tree to a runtime system of the automated system.

8. The method according to claim 2, wherein the object machine is implemented in a distributed manner as at least one object, with the hierarchical object or operator tree processing itself.

9. The method according to claim 1, wherein the modules and functions are assigned model information and/or meta-information using the input aids and/or the display device.

10. The method according to claim 2, wherein the objects of the machine-independent program present as a hierarchical object or operator tree are assigned a collection of infrastructure services or infrastructure functions that access the objects via containers assigned to the objects such that an infrastructure service or an infrastructure function can be used by all the objects.

11. A device for executing a program for an industrial automation system, comprising:

at least one computer unit with input aids, output aids and a display device;

a component for modeling and/or creating modules and functions, which respectively represent the sub-tasks of an automation solution;

a component for structuring the modules and functions and for networking the same, to form at least one hierarchical tree as at least one machine-independent program; and a component to load the machine-independent program in the form of the at least one hierarchical tree into the corresponding components of the automation system with the corresponding components of the automation system executing the machine-independent program present in the form of the at least one hierarchical tree, wherein at least one object machine is assigned to the corresponding components of the automation system to execute the machine-independent programs, and wherein the at least one object machine provides operators and objects from which the machine-independent program is provided in the form of the hierarchical tree;

a component to instantiate the operators using the at least one object machine during or after the loading of the machine-independent program into corresponding components of the automation system; and a component to convert the symbolic representation of the at least one hierarchical tree to physical addresses to generate a loadable program in the form of an executable program or operator tree.

12. The device according to claim 11, wherein the machine-independent program is present in the form of at least one object or operator tree with a structure equivalent or similar to the representation of the program in the display device.

13. The device according to claim 11, wherein the at least one object machine is configured as a real-time object machine with deterministic response and cycle times.

14. The device according to claim 11, further comprising a device for assigning model information and/or meta-information to the modules and functions.

15. The device according to claim 11, wherein the object machine is implemented as a function unit that is closed and processes the at least one hierarchical tree to a runtime system of the automated invention.

16. The device according to claim 11, wherein the object machine is implemented in a distributed manner as at least one object, with the hierarchical object or operator tree processing itself.

17. The device according to claim 11, wherein the objects of the machine-independent program present as a hierarchical object or operator tree are assigned a collection of infrastructure services or infrastructure functions that access the objects via containers assigned to the objects such that an infrastructure service or infrastructure function can be used by all the objects.

18. A computer program implementing a method for executing a program for an industrial automation system, comprising:

providing a computer unit with input aids, output aids and a display device, having modules and functions respectively representing sub-tasks of an automation solution being modeled and/or created using the input aids and optionally the display device, having the modules and functions being structured and networked using the input aids and optionally the display device so as to form. a hierarchical tree as a machine-independent program;

loading the machine-independent program in the faun of the hierarchical tree into the corresponding components of the automation system, wherein the corresponding components of the automation system execute the machine-independent program present in the form of the hierarchical tree with the aid of at least one object machine assigned to the corresponding components of the automation system, and wherein the at least one object machine provides operators and objects from which the machine-independent program is provided in the form of the hierarchical tree;

during or after loading of the machine-independent program, instantiating the operators using the at least one object machine into corresponding components of the automation system; and converting the symbolic representation of the hierarchical tree to physical addresses to generate a loadable program in the form of an executable program or operator tree.

\* \* \* \* \*